United States Patent

Johnson

[15] 3,668,557

[45] June 6, 1972

[54] LOW FREQUENCY BLOCKING OSCILLATOR

[72] Inventor: Charles H. Johnson, Silver Spring, Md.

[73] Assignee: The United States of America as represented by the Secretary of the Navy

[22] Filed: Sept. 4, 1970

[21] Appl. No.: 69,682

[52] U.S. Cl. ................................331/112, 331/149, 331/185

[51] Int. Cl. ...........................................................H03k 3/30

[58] Field of Search..................331/107, 108, 111, 112, 146, 331/147, 148, 149, 129, 185

[56] References Cited

UNITED STATES PATENTS 2,981,898 4/1961 St. John.................................331/112

3,292,015 12/1966 Neisch...................................307/318

OTHER PUBLICATIONS

Electronic Engineering, J. M. Townsend, pgs. 224– 226, Feb. 1969

*Primary Examiner*—John Kominski
*Attorney*—R.S. Sciascia and J. A. Cooke

[57] ABSTRACT

A low frequency astable blocking oscillator composed of a transistor with a first transformer winding in the collector circuit and a second transformer winding in the base circuit to provide regenerative feedback between the collector and the base. A capacitor is connected to the transistor and is charged by a constant current source to initiate operation of the blocking oscillator when a predetermined voltage is reached. A voltage breakdown device is coupled to the transistor to raise the voltage required by the capacitor before blocking oscillator action commences thereby providing low frequency operation.

4 Claims, 3 Drawing Figures

PATENTED JUN 6 1972

3,668,557

Charles H. Johnson
INVENTOR

Barry A. Cooper
AGENT

J. O. Tresansky
ATTORNEY

LOW FREQUENCY BLOCKING OSCILLATOR

BACKGROUND OF THE INVENTION

This invention relates generally to blocking oscillators and, more particularly, to a low frequency astable blocking oscillator.

Astable blocking oscillators have been utilized heretofore to provide pulse generation or the like. Basically, a blocking oscillator is a circuit including an active device whose output is coupled back to the input through a pulse transformer. The relative winding polarities of the pulse transformer are so chosen to provide regenerative feedback and, therefore, obtain a pulse train at the circuit output. The period between pulses is determined by the time constant of the blocking oscillator circuit while the individual pulse width is determined by the magnetic properties of the pulse transformer.

The pulse train generated by a blocking oscillator may be advantageously utilized as the time base for timing systems or the like. Heretofore employed conventional blocking oscillators, however, have been unable to provide adequate operation at low frequencies which is required for many long duration timing systems. More particularly, prior art blocking oscillators have been unable to provide a pulse train time base having a sufficiently long period which is required if the time base is to be utilized in long duration timing systems.

SUMMARY OF THE INVENTION

Accordingly, one object of the present invention is to provide an improved astable blocking oscillator.

Another object of the instant invention is to provide an astable blocking oscillator having a low duty cycle.

A further object of this invention is to provide a blocking oscillator for obtaining a pulse train output having a large period.

A still further object of the instant invention is to provide a blocking oscillator operable at very low frequencies.

Briefly, these and other objects of the present invention are attained by a blocking oscillator circuit having a voltage breakdown device to raise the trip point voltage of the blocking oscillator, that is, the voltage required for the blocking oscillator capacitor to charge up to before blocking oscillator action commences. The blocking oscillator capacitor is advantageously charged from a current source to obtain a pulse train output having a consistent and an accurate period.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
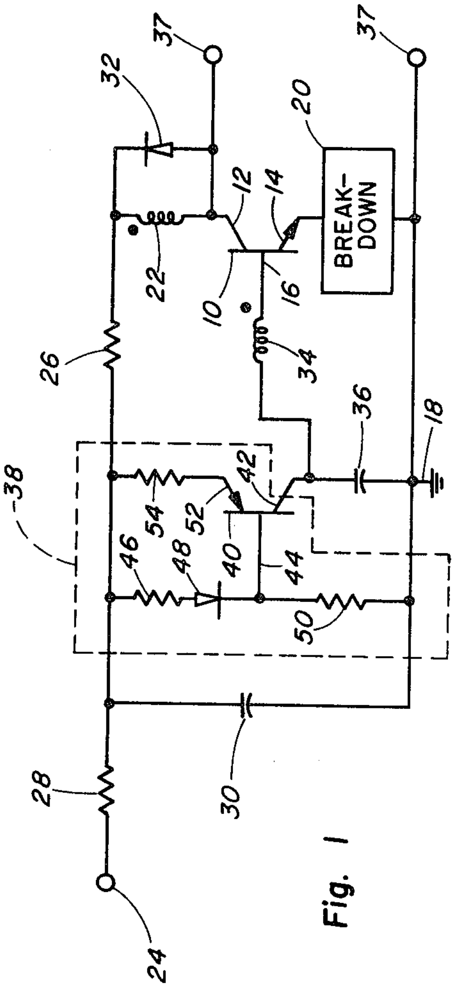
FIG. 1 is a circuit schematic view of a blocking oscillator according to the present invention.

Referring now to the drawings and more particularly to FIG. 1 thereof, the low frequency blocking oscillator of the present invention is shown as including an active element, such as, for example, a transistor 10 having a collector, emitter and base, 12, 14, 16, respectively. Emitter electrode 14 is connected to a point of reference potential, such as, ground 18, via a breakdown device 20. As hereinafter more fully explained, breakdown device 20, which may be, for example, a Silicon Unilateral Switch, a Shockley diode, or any other desired device exhibiting avalanche breakdown, is connected in the emitter circuit to provide low frequency blocking oscillator operation. A winding 22 of a pulse transformer is serially connected between collector 12 and a terminal 24 via resistors 26 and 28. Terminal 24 may be connected to any suitable source of unidirectional supply voltage (not shown). Resistor 28, in conjunction with a capacitor 30 connected between the juncture of resistors 26 and 28, and ground 18, respectively, forms a filtering network to isolate the unidirectional supply voltage from oscillator transients or the like, while resistor 26 advantageously limits the current flow through transistor 10. A unidirectionally conducting semiconductive device, such as, for example, a diode 32 is parallel connected across winding 22 to limit current flyback through the winding when the blocking oscillator is turned OFF.

Another winding 34 of the pulse transformer is connected between electrode 16 and an energy storage device, such as, for example, a capacitor 36 connected between ground potential 18 and winding 34. The pulse transformer formed by windings 22 and 34 is poled to provide regenerative feedback between base electrode 16 and collector electrode 12, that is, between the input and output, respectively, of transistor 10. Terminals 37 are connected across transistor 10 and breakdown device 20 to transfer the blocking oscillator pulse train output to any utilization device, such as a timing system or the like, connectable thereto.

As hereinafter more fully explained, capacitor 36 is charged to a predetermined voltage equal to the trip point voltage of the blocking oscillator, by a conventional constant current source, shown in dashed line at 38, connected thereto. Constant current source 38, by way of example, may include an active device, such as transistor 40 having its collector electrode 42 connected to the juncture of winding 34 and capacitor 36. Base electrode 44 thereof is connected to a voltage divider, including a serially connected resistor 46 and a semiconductive diode 48, and a resistor 50. Emitter electrode 52 of transistor 40 is coupled to terminal 24 via an emitter resistor 54 and resistor 28.

Assuming a constant current charging source, the following relationship is applicable:

$$Q=CV \tag{1}$$

wherein, $Q$ is equal to the charge on capacitor 36 in coulombs, $C$ is the value of capacitor 36 in farads, and $V$ is the voltage across the capacitor in volts. Additionally, the following relationship also applies:

$$Q=IT \tag{2}$$

wherein, $Q$ is the charge on capacitor 36 in coulombs, $I$ is the magnitude in amperes of the current charging the capacitor which is approximately equal to the current supplied by current source 38 if leakage currents are neglected, and $T$ is the charging time of the capacitor in seconds. Equating equation (1) and equation (2) yields:

$$T=CV/I \tag{3}$$

wherein, as hereinafter more fully explained, $T$ is the OFF time of the blocking oscillator and is approximately equal to the period of the blocking oscillator pulse train output.

Referring to equation (3), it becomes apparent that the period of the blocking oscillator pulse train may be increased, and, consequently, low frequency operation achieved, by maximizing the value of $T$ in equation (3). While it is possible to increase the value of capacitance and/or decrease the value of charging current, the blocking oscillator according to the present invention provides an increased pulse train period by increasing the charging voltage $V$ that capacitor 36 must reach before blocking oscillator action commences. More particularly, breakdown device 20, exhibiting avalanche breakdown action, increases the voltage that capacitor 36 must charge to from a first threshold voltage equal to approximately the "cut in" voltage of the emitter-base junction of transistor 10 (approximately 0.5 volts for silicon and 0.1 volts for germanium transistors, respectively) to a second threshold voltage equal approximately to the sum of the "cut in" voltage of transistor 10 and the breakdown voltage of device 20. For illustrative purposes, breakdown device 20 may be a Silicon Unilateral Switch possessing a breakdown voltage of approximately 8 volts, or the like, and having a high impedance as seen by capacitor 36. It is readily apparent, of course, that other devices exhibiting avalanche breakdown may be utilized if desired.

Figure 2A:
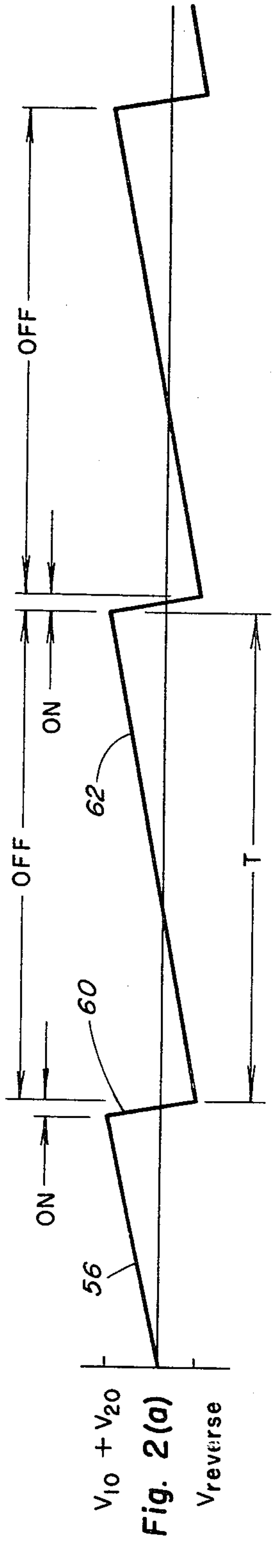
FIGS. 2*a* and 2*b* are graphical diagrams of various waveforms associated with the blocking oscillator of FIG. 1.
Figure 2B:
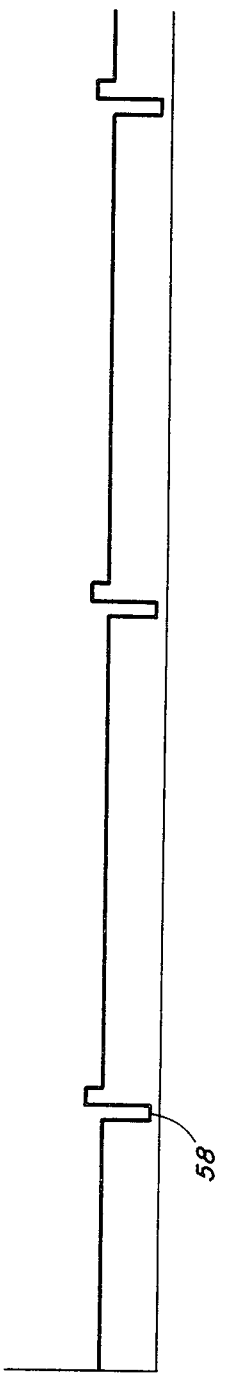

The operation of the astable blocking oscillator according to the present invention may be better understood by reference to the waveforms of FIGS. 2(*a*) and 2(*b*) which show the voltage across capacitor 36 and the blocking oscillator output at terminals 37, respectively. Initially, at time $T=0$, capacitor 36 is uncharged. When power is supplied between terminal 24 and ground 18, capacitor 36 will start to charge due to the application of a current $I$ supplied from current source 38. The magnitude of the current $I$ is determined by the voltage available at terminal 24 and the magnitude of resistors 46, 50 and 54. Assuming, for illustrative purposes, the voltage across capacitor 30 to be 12 volts and resistors 46, 50 and 54 to be 1 megohm, 11 megohms and 0.5 megohm, respectively; the current flow through the emitter-collector junction of transistor 40 will be approximately 1 $\mu a$. Since the impedance of breakdown device 20 is quite large, a charging current $I = 1\ \mu a$ will flow almost exclusively to capacitor 36 to charge up the same. It should be noted that for all the current to charge capacitor 36, the capacitor should have a high shunt resistance.

The voltage across capacitor 36, as indicated at 56 in FIG. 2(*a*), will linearly increase as the capacitor is charged by the constant current source. The capacitor will linearly charge until a voltage is reached approximately equal to the sum of the "cut in" voltage across the base-emitter-junction of transistor 10 and the breakdown voltage of breakdown device 20. When the voltage across capacitor 36 reaches this value, the blocking oscillator will turn ON and blocking oscillator action will commence. The duration of the blocking oscillator ON time is determined, in part, by the turns ratio of windings 22 and 34, the inductive value of these windings and the coupling therebetween, the size of capacitor 36, and the like.

The blocking oscillator provides a pulse 58, as shown in FIG. 2(*b*), at output terminals 37 as is well known in the art. Similarly, during the blocking oscillator ON time as shown at 60, capacitor 36 discharges and regenerative feedback provided by windings 22 and 34 negatively charges the capacitor to a predetermined reverse voltage. When the blocking oscillator turns OFF capacitor 36, charged to a negative voltage due to blocking oscillator action, will be positively charged by current source 38 and linearly increase in voltage from the negative reverse voltage to the sum of the "cut in" and breakdown voltages of transistor 10 and breakdown device 20, respectively, as indicated by interval 62 at which time the blocking oscillator turns ON and the cycle is repeated.

For illustrative purposes, a blocking oscillator according to the instant invention having a capacitor of 10 $\mu f$, charged by a constant current $I = 1\ \mu a$, from a reverse voltage −7 volts to a voltage wherein $V(\text{"cut in"}) + V(\text{breakdown}) = 8.5$ volts, provides an OFF time interval 62 (approximately equal to the blocking oscillator period):

$$T=\frac{(10\times10^{-6})(15.5)}{1\times10^{-6}}=155 \text{ seconds}$$

as given by equation (3). In contradistinction, a conventional blocking oscillator would commence blocking oscillator action when the voltage across the capacitor reaches the "cut in" voltage of the transistor. Thus, an equivalent conventional blocking oscillator could only provide, at best, output pulses having a period:

$$T=\frac{(10\times10^{-6})(7.5)}{1\times10^{-6}}=75 \text{ seconds}$$

or a period less than 50 percent that provided according to the present invention.

It is readily apparent, therefore, that by inserting a breakdown device in the emitter circuit of a blocking oscillator, low frequency operation may be readily obtained. Obviously, numerous modifications and variations of the present invention are possible in light of the above teachings. Thus, while the blocking oscillator circuit utilizes a constant current source to linearly charge the capacitor, it may be desirable to utilize resistance charging of the capacitor from a voltage source or the like in which case the capacitor would charge exponentionally. Similarly, it may be desirable to charge the capacitor from a separate battery or the like. Furthermore, it is readily apparent that the capacitor may be inserted in the emitter circuit of the blocking oscillator. It is therefore to be understood that within the scope of the appended claims the invention may be practiced otherwise than as specifically described.

What is new and desired to be claimed by Letters Patent of the United States is:

1. A low frequency blocking oscillator comprising
   a transistor having base, emitter and collector electrodes,
   means for providing regenerative feedback between said collector and base electrodes including a transformer having a first winding connected to said collector electrode and a second winding connected to said base electrode,
   an avalanche breakdown device connected to said emitter electrode of said transistor for raising the threshold voltage of said transistor,
   energy storage means connected between said second transformer winding and said breakdown device, and
   means for charging said energy storage means to said raised threshold voltage to initiate operation of transistor.
2. A low frequency blocking oscillator according to claim 1 wherein
   said energy storage means is a capacitor, and
   said means for charging said energy storage means is a constant current source connected to said capacitor and said first transformer winding.
3. A low frequency blocking oscillator according to claim 2 wherein
   said constant current source comprises a transistor having its collector connected to said second transformer winding and said capacitor, and having its base connected to a voltage divider including a diode a voltage divider and a diode.
4. A low frequency blocking oscillator according to claim 3 further comprising
   a diode in parallel with said first transformer winding to limit current flyback, and wherein
   said avalanche breakdown device comprises a silicon unilateral switch.

* * * * *